(12) United States Patent
Szczyrbowski et al.

(10) Patent No.: US 6,180,247 B1
(45) Date of Patent: Jan. 30, 2001

(54) THERMALLY-INSULATING COATING SYSTEM

(75) Inventors: Joachim Szczyrbowski, Goldbach; Manfred Ruske, Hanau; Anton Zmelty, Hösbach, all of (DE)

(73) Assignee: Leybold Systems GmbH, Hanau (DE)

( * ) Notice: Under 35 U.S.C. 154(b), the term of this patent shall be extended for 0 days.

(21) Appl. No.: 09/222,361

(22) Filed: Dec. 29, 1998

(30) Foreign Application Priority Data

Oct. 30, 1998 (DE) ................................ 198 50 023

(51) Int. Cl.$^7$ ................ B32B 15/00; B32B 17/06
(52) U.S. Cl. ............. 428/432; 428/213; 428/216; 428/336; 428/432; 428/434; 428/697; 428/698; 428/699; 106/287.19; 106/287.13; 106/316; 501/96.1; 501/97.1; 296/84.1
(58) Field of Search ................... 428/213, 434, 428/469, 472, 336, 432, 216, 697, 699, 701, 702, 698; 106/287.19, 287.3, 316; 501/96.1, 97.1; 296/84.1

(56) References Cited

U.S. PATENT DOCUMENTS 5,264,286 * 11/1993 Ando et al. ................ 428/432

FOREIGN PATENT DOCUMENTS

| 196 32 788 | 2/1998 | (DE) . |
| 0035906 | 9/1981 | (EP) . |
| 0304234 | 2/1989 | (EP) . |
| 0722913 | 7/1996 | (EP) . |
| 93/20256 * | 10/1993 | (WO) ................ C23C/14/14 |

* cited by examiner

Primary Examiner—Deborah Jones
Assistant Examiner—Lymarie Miranda
(74) Attorney, Agent, or Firm—Smith, Gambrell & Russell, LLP

(57) ABSTRACT

A thermally insulating coating system for curved and/or hardened glass panes includes at least one layer of noble metal enclosed by a lower and an upper blocker layer. An underoxidic $NiCrO_x$ layer with a thickness between one Å and two nm is embedded into the noble-metal layer. The advantage is that the optical qualities of the coating system are not influenced by the tempering and curving of the glass pane.

12 Claims, No Drawings

THERMALLY-INSULATING COATING SYSTEM

INTRODUCTION AND BACKGROUND

The present invention relates to a thermally-insulating coating system for curved and/or hardened glass panes comprising at least one layer of noble metal enclosed by a lower and an upper blocker layer.

In another aspect, the present invention relates to the method of depositing the heat insulating layers onto a glass pane or panel and the production of glass products, such as automotive glass therefrom.

It is known in the art that coating systems can be applied to flat glass panes, that is, onto the flat glass. The coated flat glass is then heated up to just below its softening temperature and hardened by a shock-like cooling off. The curving or bending of the glass panes takes place between the heating and the quenching.

Thermally reflecting coating systems are known in which the glass panes are curved and/or hardened after the application of the coating system. For heat reflection one or several coatings of noble metal, e.g. silver on account of its good selective reflection capacity even at low coating thicknesses, is customarily used.

It is furthermore generally known that highly refractive dielectric layers can be arranged above and below the silver layer in order to improve the optical qualities. During the application of, for example, a metal-oxide layer on the silver and during the curving and/or hardening of the coated glass substrates with the associated heating, oxidation of the silver coating and diffusion of the silver into the metal-oxide coating tends to occur. The oxidation is caused by the fact that during the reactive application of the metal-oxide layer the oxygen that leaks in reacts with the silver. Also, during the heating of the coated glass panes the oxygen of the metal-oxide layer is activated and also unites with the silver. In addition, the diffusion of the silver is increased, as a result of which the thickness of the silver layer decreases. The reflection power of the coated glass panes is reduced by the oxidation and diffusion that takes place.

A coating system for curved and/or hardened glass panes is known (DE 196 32 788) which consists of dielectric layers, intermediate layers and at least one noble-metal layer. A dielectric layer, a metallic intermediate layer, a silver layer, another metallic intermediate layer and a dielectric layer following the coating system are successively sputtered by atomization onto the flat glass pane and the metallic intermediate coatings consist of an alloy of AlMgMn.

Furthermore, a multi-layer structure is known with selective light transmittency (EP 0,035,906) consisting of a substrate layer A, with a transparent laminar structure which carries a layer D which contains silver metal, has a thickness of 50 to 300 Å and reflects infrared waves, as well as a transparent thin layer $B_1$, with a high degree of refraction between layers A and D and/or a transparent thin layer $B_2$ with a high index of refraction for layer D and, selectively, a transparent cover layer E on layer $B_2$ (if present) or layer D; a layer C, consisting of a material which was selected from the group consisting of Ti, Zr, In, Si, C, Co and Ni and has a thickness of 3 to 100 Å, on layer D stands in contact with the latter on its side opposite layer A.

A glass pane with a transparent film is also known (EP 0,304,234) which film comprises a metal coating sensitive to tarnishing in the presence of an agent which causes tarnishing, and which film comprises a separate blocking layer which is further removed from the surface of the glass pane than is the metal layer. The blocking layer comprises metal-oxide layers including a layer of an oxide of a metal Me 1 which is located between layers of an oxide of a metal Me 2. Me 1 is titanium, zirconium or hafnium or a mixture of them and Me 2 is zinc, tin, indium or bismuth or a mixture of them.

Finally, a glass object, coated by sputtering a glass substrate is known (EP 0,722,913) which has a system consisting of the following layers, oriented outward from the glass:

A layer coating of $Si_3N_4$ with a thickness of 300 to 500 Å;

a layer of nickel or nickel chromium with a thickness of approximately 7 Å or less;

a layer of silver with a thickness of approximately 70 to 130 Å;

a layer of nickel or nickel chromium with a thickness of approximately 7 Å or less; and a layer of $Si_3N_4$ with a thickness of 700 to 1100 Å;

a layer of nickel or nickel chromium with a thickness of approximately 7 Å or less;

a layer of silver with a thickness of approximately 70 to 90 Å;

a layer of nickel or nickel chromium with a thickness of approximately 7 Å or less; and a layer of $Si_3N_4$ with a thickness of 350 to 700 Å.

An object of the present invention is to enable the deposition by sputtering of a thermally insulating layer and the tempering and curving of a glass substrate without significantly changing the optical qualities of the combination of the layers. In particular, the haze (diffuse scatter) should be less than 0.5 after the tempering.

SUMMARY OF THE INVENTION

The above and other objects of the invention can be achieved by forming a suboxidic layer of $NiCrO_x$ with a thickness between 0.1 and 3.0 nm embedded into the noble metal layer in the combination of thermally insulating layers.

The blocker layers enclosing the noble metal layers are preferably formed from suboxidic $NiCrO_x$ or suboxidic $NiCrO_x$, and $TiO_2$.

A silver layer is advantageously selected as the noble metal layer, which silver layer is preferably applied by sputtering with a small amount of oxygen amounting to 0 to 10 sccm at a cathode output of 1.5 KW.

Layers (e.g. $Si_3N_4$, $TiO_2$) produced by sputtering with the TwinMag apparatus in which two cathodes are connected in such a manner to an alternating voltage that they are alternatingly cathode and anode of a gas discharge are, as a result of a strong ion bombardment during the sputtering process, very compact, have a very high density, are very hard and mechanically and chemically very stable. As a result of the high density, the sputtered layers constitute a very effective diffusion barrier for foreign atoms (oxygen, sulfur and others). Furthermore, the TwinMag technology makes possible the production of layers with a very smooth surface. This effect significantly improves the electric qualities of an Ag layer applied to them. All these qualities are desirable in the manufacture of coating systems which are capable of being tempered or curved.

DETAILED EMBODIMENTS OF THE INVENTION

The following coating systems were produced in a vacuum system with four cathodes—a TwinMag cathode with metallic Si target, a TwinMag cathode with Ti target, a DC magnetron with Ag target and a DC magnetron with NiCr target:

1. Glass/$TiO_2$/$NiCrO_x$/$TiO_2$/$AgO_x$/$NiCrO_x$/$AgO_x$/$NiCrO_x$/$Si_3N_4$
2. Glass/$TiO_2$/$NiCrO_x$/$AgO_x$/$NiCrO_x$/$AgO_x$/$NiCrO_x$/$Si_3N_4$
3. Glass/$TiO_2$/$NiCrO_x$/$TiO_2$/$AgO_x$/$NiCrO_x$/$Si_3N_4$
4. Glass/$TiO_2$/ZnO/Ag/$NiCrO_x$/$Si_3N_4$ $TiO_2$ was sputtered with a Ti target in a reactive atmosphere of $O_2$ and Ar.

The process was carried out in the metallic mode of the cathode characteristic. For the preparation of pure metallic layers, a pure metallic target is used in the sputtering process, wherein as the process gas a pure inert gas, such as argon is used. If the inert gas contains any oxygen mixed therein, then the resulting layer is no longer purely metallic, but is partially metal oxidic.

$Si_3N_4$ was sputtered with a Si target in a reactive atmosphere of $N_2$ and Ar.

$NiCrO_x$ was deposited by sputtering with a NiCr target in a reactive gaseous atmosphere of argon and a very small amount of $O_2$. The process was carried out in the metallic mode of the cathode characteristic. The amount of oxygen present in the gas was just sufficient to produce an oxide layer which contains no unbound oxygen atoms. The amount of oxygen was determined in such a manner that the cathode burned very close to the transitional area.

The Ag target was sputtered in a reactive atmosphere of $O_2$ and Ar. The amount of oxygen was selected in such a manner that the resistance of the Ar layer did not rise by more than 10%.

In the second coating system the second $TiO_2$ layer was eliminated. The effect of the $TiO_2$ blocker layer was thereby able to be shown. The task of this layer is to suppress the light scattering of the system after the tempering.

A third coating system was produced as a further comparison in which system the Ag layer was not divided up. The thickness of the Ag layer is equal here to the sum of the Ag layers in the first system.

The fourth coating system, which represents a normal Low-e coating, was sputtered as a further test.

These coating systems were exposed to a temperature of 700° C. for up to 6 min.

The following measurements were performed on the examined coating systems before and after the tempering:

1. Optical transmission Ty (Ty=transmission taking into consideration the eye sensitivity ≈550 nm) and reflection Ry (Ry=reflection)
2. Color coordinates in reflection a* and b* (glass side)
3. Surface area resistance
4. Wash test (Erichsen test)
5. Haze (haze=diffuse scatter)

The results are listed in tables I and II

TABLE I

| Layer | Thickness (nm) System 1 | Thickness (nm) System 2 | Thickness (nm) System 3 | Thickness (nm) System 4 |
| --- | --- | --- | --- | --- |
| Glass | 4 mm | 14 mm | 4 mm | 4 mm |
| $TiO_2$ | 16 nm | 22 nm | 16 nm | 22 nm |
| $NiCrO_x$ | 6 | 6 | 6 | |
| $TiO_2$ | 6 | | 6 | |
| ZnO | | | | 6 |
| Ag | | | | 16 |
| $AgO_x$ | 8 | 8 | 16 | |
| $NiCrO_x$ | 1 | 1 | | |
| $AgO_x$ | 8 | 8 | | |
| $NiCrO_x$ | 4.5 | 4.5 | 4.5 | 2 |
| $Si_3N_4$ | 52 | 52 | 52 | 52 |

TABLE II

| | System 1 | | System 2 | | System 3 | | System 4 | |
| --- | --- | --- | --- | --- | --- | --- | --- | --- |
| Layer | before | after | before | after | before | after | before | after |
| Ty (%) | 78 | 80 | 77 | 80 | 80 | 82 | 81 | 85 |
| Ry (%) | 11.5 | 12 | 11.5 | 12.1 | 11.2 | 11.5 | 11.0 | 12.5 |
| a* | 0.2 | 1.0 | 0.1 | 0.2 | 0.2 | 1.5 | −1.0 | 2.0 |
| b* | −3.0 | −4.7 | −3.4 | −6.2 | −3.0 | −4.7 | −3.0 | −4.9 |
| R (Ohm) | 4.8 | 3.8 | 4.8 | 3.5 | 3.7 | 2.5 | 4.0 | 6.0 |
| Haze (%) | 0.2 | 0.25 | 0.2 | 0.75 | 0.2 | 0.35 | 0.2 | 2.0 |
| Wash test | very good | very good | very good | very good | very good | poor | | |

In coating system 1 identified in the preceding tables the lower and the upper layers have the function of traditional low-e layers. These coatings should be very dense in order to avoid the diffusion of oxygen or of other atoms into the silver layer.

The upper and the lower NiCr blocker layers provide the desired temperature stability of the coating system. The are purposefully sputtered on in the metallic mode of the cathode characteristic as close as possible to the area of the transition into the oxidic mode. The NiCr blockers between the two Ag layers bring about the wiping resistance after the tempering. Their service life is a function of their thickness and the degree of their oxidation: the thicker the blockers are, the less sensitive the combination packet is mechanically.

The second $TiO_2$ layer reduces the fogging and light scattering after the heat treatment of the coated substrate. The precisely measured amount of oxygen in the silver layer brings about the temperature resistance as well as the mechanical resistance of the coating combination. The upper limit of the amount of oxygen determines the stability of the silver layer and should be below 3%.

In the foregoing, the symbol "x" is a variable number and for example, when used to define $NiCrO_x$ it can indicate $NiCrO_2$ as well as $NiCrO_4$. Depending on the amount of oxygen in the process gas, the value can be one or the other.

Further variations and modifications of the foregoing will be apparent to those skilled in the art and are intended to be encompassed by the claims appended hereto.

German priority application 198 50 023.8 is relied on and incorporated herein by reference.

We claim:

1. A thermally-insulating coating system for a curved and/or hardened glass pane, comprising: at least one noble metal layer enclosed by a lower blocker layer and an upper blocker layer, wherein an underoxidic $NiCrO_x$ layer is embedded into the noble metal layer, wherein the embedded underoxidic $NiCrO_x$ layer has a thickness between 0.1 and 3.0 nm.

2. The coating system according to claim 1, wherein the blocker layers enclosing the noble-metal layer consist of underoxidic $NiCrO_x$ or underoxidic $NiCrO_x$ and $TiO_2$.

3. The coating system according to claim 1, wherein the noble metal layer is a silver layer.

4. The coating system according to claim 1, wherein the noble metal layer is a silver layer which is precipitated with a slight oxygen component, wherein the oxygen component is present in an amount such that an electric resistance of the noble metal layer does not exceed 10%.

5. A thermally-insulating coating system for a curved and/or hardened glass pane comprising the following layers oriented outward from the glass pane:

a layer of $TiO_2$ with a thickness of 16 nm, a layer of $NiCrO_x$ with a thickness of 6 nm, a layer of $TiO_2$ with a thickness of 6 nm, a layer of Ag with embedded $NiCrO_x$, wherein the embedded $NiCrO_x$ in the layer of Ag has a thickness of 1 nm, a layer of $NiCrO_x$ with a thickness of 4.5 nm, and a layer of $Si_3N_4$ with a thickness of 50 nm.

6. The coating system according to claim 1, further comprising a $TiO_2$ layer, which suppresses light scattering arranged between the lower blocker layer and the noble metal layer.

7. A thermally-insulating coating system for a curved and/or hardened glass pane comprising the following layers oriented outward from the glass pane:

a layer of $TiO_2$ with a thickness of 16 nm, a layer of $NiCrO_x$ with a thickness of 6 nm, a layer of $TiO_2$ with a thickness of 6 nm, a layer of $AgO_x$ with a thickness of 8 nm, a layer of $NiCrO_x$ with a thickness of 2 nm, a layer of $AgO_x$ with a thickness of 8 nm, a layer of $NiCrO_x$ with a thickness of 4 nm, and a layer of $Si_3N_4$ with a thickness of 50 nm.

8. A glass surface having adhered thereto a thermally-insulating coating system comprising at least one noble metal layer enclosed by a lower blocker layer and an upper blocker layer, wherein an underoxidic $NiCrO_x$ layer with a thickness between 0.1 and 3.0 nm is embedded into the noble metal layer.

9. The glass surface according to claim 8, wherein the blocker layers enclosing the noble-metal layer consist of underoxidic $NiCrO_x$ or underoxidic $NiCrO_x$ and $TiO_2$.

10. The glass surface according to claim 8, wherein the noble metal layer is a silver layer.

11. An automotive windshield coated with the thermally insulating coating system of claim 1.

12. A method for making a glass pane or panel of thermal insulating properties comprising depositing by sputtering onto said glass at least one noble metal layer enclosed by a lower blocker layer and an upper blocker layer, wherein an underoxidic $NiCrO_x$ layer is embedded into the noble metal layer wherein the embedded underoxidic $NiCrO_x$ layer has a thickness between 0.1 and 3.0 nm.

* * * * *